UNITED STATES PATENT OFFICE.

ALFRED MOLHANT, OF MONS, BELGIUM.

SACCHARIFICATION AND FERMENTATION OF AMYLACEOUS SUBSTANCES.

1,134,281.     Specification of Letters Patent.     Patented Apr. 6, 1915.

No Drawing.     Application filed July 17, 1914. Serial No. 851,475.

*To all whom it may concern:*

Be it known that I, ALFRED MOLHANT, a subject of the King of Belgium, residing at Mons, Belgium, have invented new and useful Improvements in or Relating to the Saccharification and Fermentation of Amylaceous Substances, of which the following is a specification.

This invention has reference to improvements in or relating to the saccharification and fermentation of amylaceous substances, and its main object is to facilitate the liquefaction of the said substances and thus render their saccharification and fermentation easier, further objects being to effect certain economies in carrying out these operations and to render the mash or wort aseptic so that it is not liable to be over-run with deleterious bacteria.

The objects indicated are attained by adding boracic acid or its compounds to the amylaceous substances, before they are subjected to the usual process of boiling under pressure, and by employing a yeast which has been acclimatized to boracic acid by being cultivated in a nutritive medium to which increasing doses of boracic acid are added.

I have found as the result of a series of experiments that boracic acid and its compounds have the remarkable property of dissolving starch, and that when this property is utilized in a distillery in treating amylaceous substances with a view to their saccharification and fermentation the work is carried out more easily, more regularly and above all more economically.

In carrying my invention into practice, I introduce the dose of boracic acid or one of its compounds into the boiler together with the amylaceous substances to be treated. The proper dose to obtain the best results varies according to the nature of the substances but as a rule the addition of about .5% by weight gives a satisfactory result. The liquefaction of the starch is brought about much more easily and the boiling operation is completed in a shorter time and more effectively. There is a considerable saving of steam and a better utilization of the material, and with respect to the saccharification the advantages are likewise very important for the proportion of malt necessary is considerably less than is required in working in accordance with any of the known processes. My process also has an important effect upon the fermentation, for boracic acid being antiseptic renders the mash or wort aseptic and prevents it being over-run by injurious bacteria, thus giving a higher and more regular output. In order to enable mash or wort prepared as described to be fermented, it is necessary as already indicated to employ a yeast which has been acclimatized to boracic acid, and I effect this acclimitization by cultivating the yeast in a nutritive medium to which doses of boracic acid increasing from .1 to .5% are added.

What I claim as my invention and desire to secure by Letters Patent is:—

1. In processes for the saccharification and fermentation of amylaceous substances, the employment of boracic acid or any of its compounds for the purposes set forth.

2. In the liquefaction of amylaceous substances by boiling under pressure, with a view to their saccharification and subsequent fermentation, the addition to the said substances before boiling of about one part of boracic acid for each two hundred parts by weight of the said substances.

3. In the fermentation of amylaceous substances that have been treated with boracic acid, the employment of a yeast that has been acclimatized to boracic acid substantially as set forth.

In testimony whereof I have signed my name to this specification in the presence of two subscribing witnesses.

ALFRED MOLHANT.

Witnesses:
   GUSTAVE TIERRY,
   GE. BOLANG.